(12) United States Patent
Welch (10) Patent No.: US 9,175,607 B2
(45) Date of Patent: Nov. 3, 2015

(54) APPARATUS AND METHOD FOR SHIELDING A THRUST REVERSER STRUCTURE FROM ENGINE HEAT

(75) Inventor: John M. Welch, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 1326 days.

(21) Appl. No.: 13/008,120

(22) Filed: Jan. 18, 2011

(65) Prior Publication Data

US 2012/0181359 A1 Jul. 19, 2012

(51) Int. Cl.
| | |
|---|---|
| *F02C 7/24* | (2006.01) |
| *F02K 1/82* | (2006.01) |
| *B64D 29/00* | (2006.01) |
| *B32B 5/02* | (2006.01) |
| *B32B 7/12* | (2006.01) |
| *B32B 27/08* | (2006.01) |
| *B32B 27/12* | (2006.01) |
| *B32B 27/28* | (2006.01) |
| *B32B 3/02* | (2006.01) |
| *B32B 3/12* | (2006.01) |
| *B32B 3/30* | (2006.01) |

(52) U.S. Cl.
CPC ... *F02C 7/24* (2013.01); *B32B 3/02* (2013.01); *B32B 3/12* (2013.01); *B32B 3/30* (2013.01); *B32B 5/024* (2013.01); *B32B 7/12* (2013.01); *B32B 27/08* (2013.01); *B32B 27/12* (2013.01); *B32B 27/281* (2013.01); *B64D 29/00* (2013.01); *B32B 2260/021* (2013.01); *B32B 2260/046* (2013.01); *B32B 2262/101* (2013.01); *B32B 2262/106* (2013.01); *B32B 2307/306* (2013.01); *B32B 2307/3065* (2013.01); *B32B 2605/18* (2013.01); *B32B 2607/00* (2013.01); *F05D 2230/60* (2013.01); *F05D 2240/15* (2013.01); *F05D 2240/55* (2013.01); *F05D 2300/603* (2013.01); *Y02T 50/672* (2013.01); *Y10T 29/49826* (2015.01)

(58) Field of Classification Search
CPC .......... F05D 2240/15; F05D 2250/283; F05D 2300/603; F02K 1/822; B32B 3/04; B32B 3/06; B32B 3/12; B32B 3/30; B32B 5/024; B32B 5/08; B32B 5/10; B32B 5/16; B32B 7/13; B32B 9/007; B32B 17/066; B32B 17/067; B32B 27/02; B32B 27/04; B32B 27/12; F02C 7/24

See application file for complete search history.

(56) References Cited

U.S. PATENT DOCUMENTS

| | | | |
|---|---|---|---|
| 4,567,076 A | 1/1986 | Therrien | |
| 6,503,596 B1 | 1/2003 | Fellman | |
| 7,246,993 B2 * | 7/2007 | Bolms et al. | 415/116 |
| 2006/0248854 A1 * | 11/2006 | Bartley-Cho et al. | 52/782.1 |
| 2012/0082808 A1 * | 4/2012 | Lemains et al. | 428/34.1 |
| 2012/0177490 A1 * | 7/2012 | Lussier et al. | 415/213.1 |

* cited by examiner

*Primary Examiner* — Phutthiwat Wongwian
*Assistant Examiner* — Arun Goyal
(74) *Attorney, Agent, or Firm* — Hovey Williams LLP (57) ABSTRACT

A heat-resistant apparatus comprising a plurality of rigid, fireproof panels mounted to an inner surface of an inner fixed structure (IFS) of an aircraft thrust reverser. The plurality of panels may include fixed panels and floating panels, with the fixed panels fastened directly to the IFS and the floating panels fastened to the fixed panels in a substantially checkered arrangement along the inner surface of the IFS. The fixed and floating panels may each comprise a rigid core surrounded by various fireproof or heat resistant materials. The fixed and floating panels may be configured and affixed to the IFS such that air from an engine's fan may flow through a space between the panels and the IFS, providing additional cooling and heat resistance.

18 Claims, 7 Drawing Sheets

APPARATUS AND METHOD FOR SHIELDING A THRUST REVERSER STRUCTURE FROM ENGINE HEAT

BACKGROUND

1. Field

The present invention relates to aircraft parts. More particularly, the invention relates to an apparatus and method for shielding parts of a thrust reverser from aircraft engine heat.

2. Related Art

Commercial aircrafts generally have two or more nacelles, each including a thrust reverser circumferentially surrounding an engine. Aircraft engines radiate intense heat during flight. To ensure that the heat produced by the engine does not adversely affect or damage any parts of the thrust reverser, a heat "blanket" is typically placed between an inner fixed structure (IFS) of the thrust reverser and the engine. The blanket is substantially fireproof, typically comprised of a fiberglass cloth, and is fastened with various clips to the IFS. Because of the flexible nature of the blanket, it can be flimsy, and any damage to the blanket or air leakage between the blanket and the IFS can cause the blanket to flutter, creating a ballooning affect and/or causing the blanket to pull or tear away from the clips holding it to the IFS. Weakening of the heat shielding provided by the blanket may allow the IFS to be damaged. The blanket also does not provide resistance to deflection, dynamic excitation, or ballooning.

Accordingly, there is a need for an improved aircraft engine heat shielding that does not suffer from the limitations of the prior art.

SUMMARY

The present invention provides a heat-resistant apparatus comprised of a plurality of rigid, fireproof panels mounted to an inner surface of an inner fixed structure (IFS) of an aircraft thrust reverser. The panels may include fixed panels and floating panels, with the fixed panels fastened directly to the IFS and the floating panels fastened to the fixed panels in a substantially checkered arrangement along the inner surface of the IFS.

The fixed and floating panels may each comprise a rigid core surrounded by various fireproof or heat resistant materials. For example, the core may be a honeycomb core surrounded by and bonded to composite material and/or various heat-resistant material. The fixed and floating panels may be configured and affixed to the IFS such that air may flow through a space between the panels and the IFS. The fixed panels may have a plurality of holes formed near their forward and aft edges to allow air to pass between the IFS and the floating and fixed panels. The floating panels may be attached to the fixed panels such that the holes of the fixed panels are positioned between one of the floating panels and the IFS. The floating panels may be fixed to the fixed panels, such that the floating panels cover fasteners connecting the fixed panels to the IFS and shielding the fasteners from engine heat. One or more holes may be formed within the IFS proximate a forward end of the IFS to allow cooler air from the fan duct into the space between the IFS and the panels.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
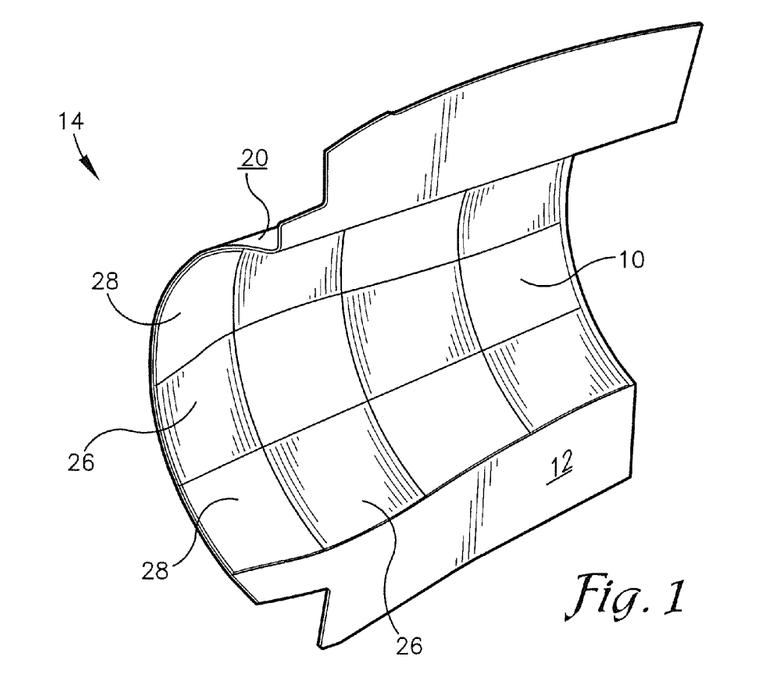
FIG. 1 is a perspective view of a heat-resistant apparatus comprising fixed panels and floating panels constructed in accordance with an embodiment of the present invention and mounted on an inner fixed structure (IFS)
Figure 2:
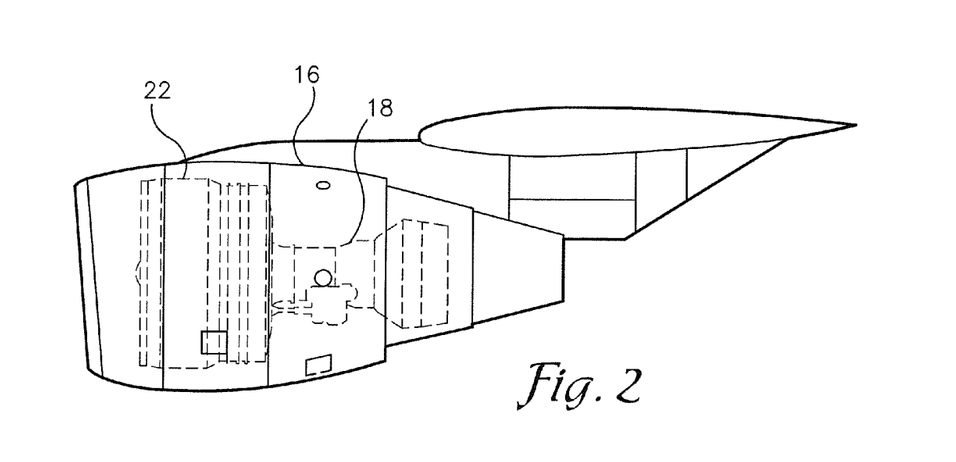
FIG. 2 is a schematic view of an aircraft engine and thrust reverser comprising one or more of the IFS of FIG. 1.
Figure 3:
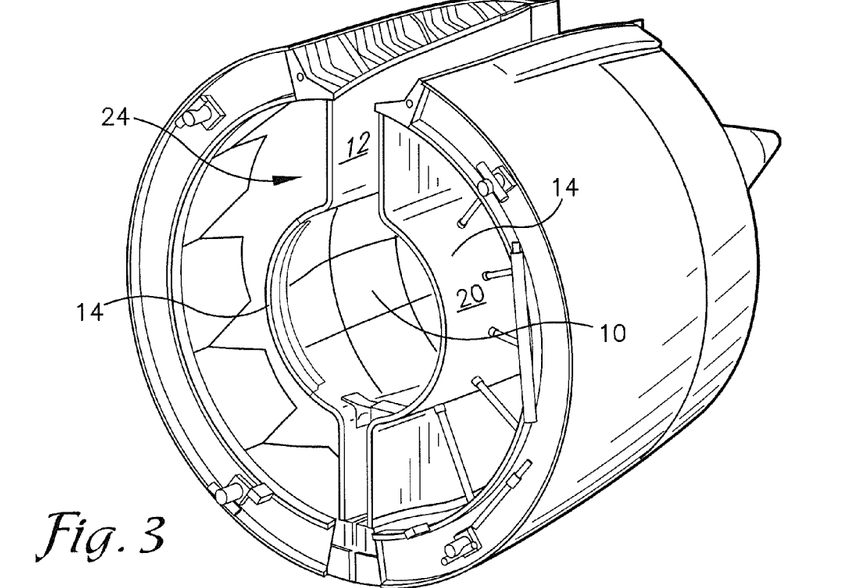
FIG. 3 is a front perspective view of a fan duct and thrust reverser of FIG. 2, including the IFS of FIG. 1.
Figure 4:
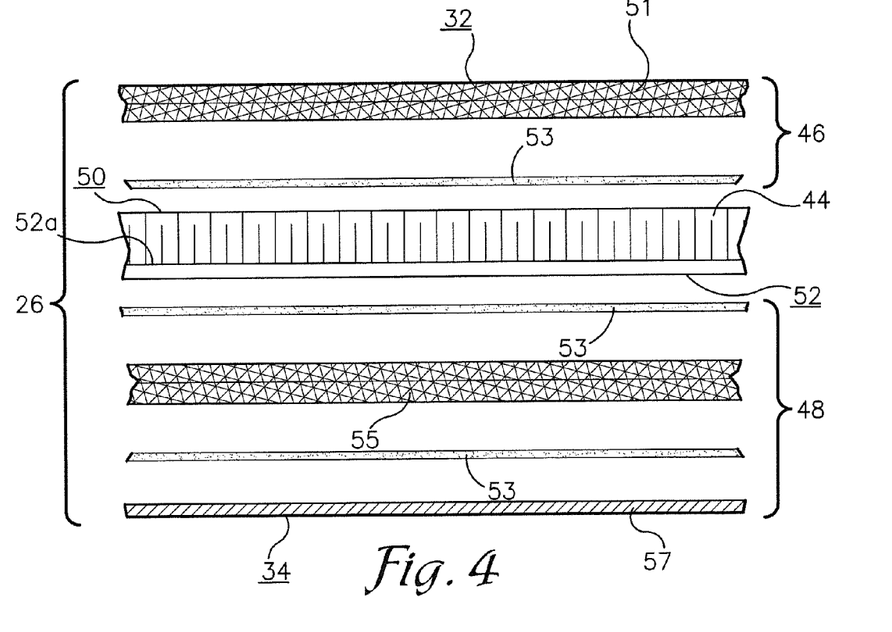
FIG. 4 is an exploded cross-sectional view of one of the panels of FIG. 1.
Figures 5, 6:
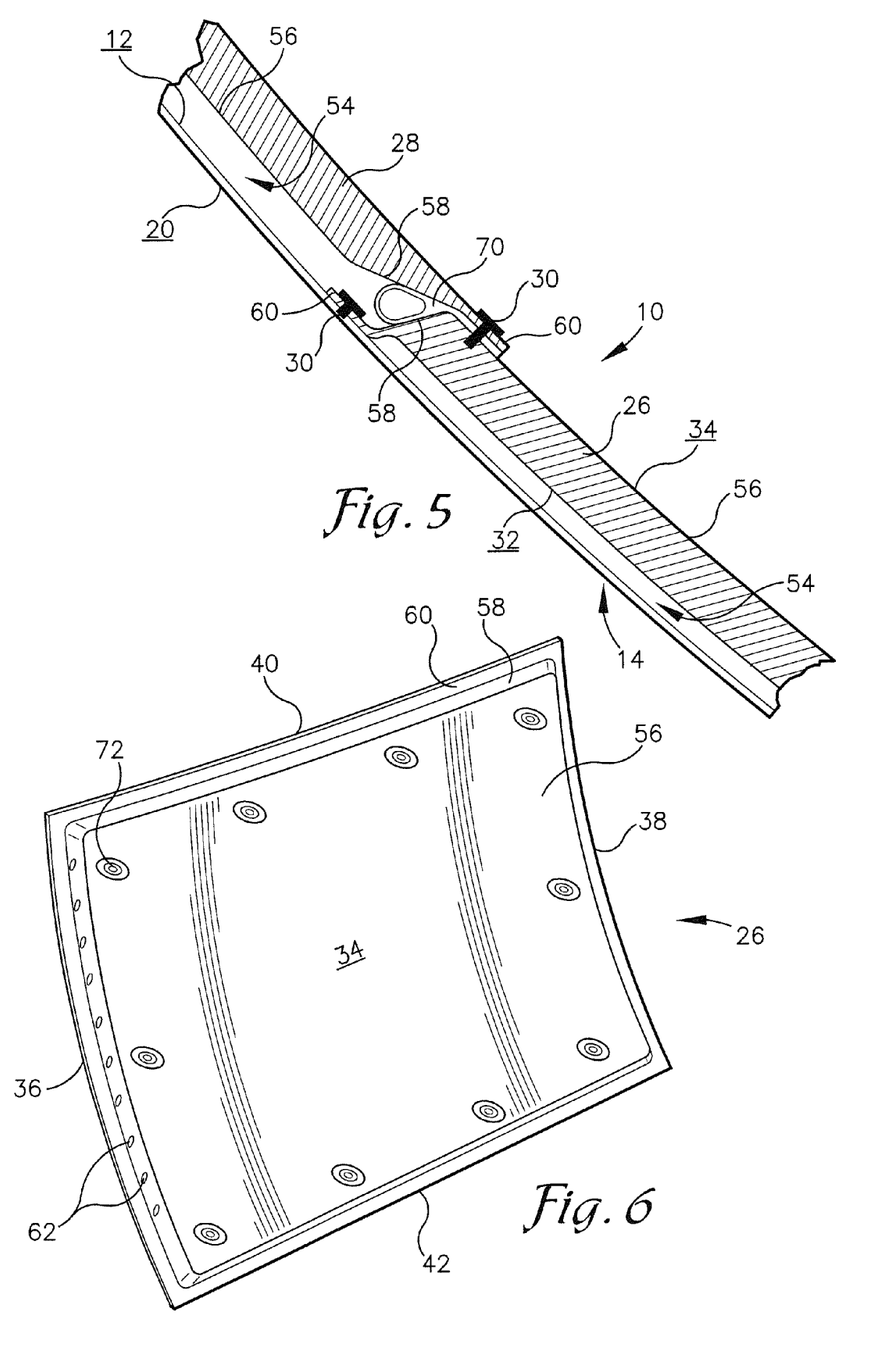
FIG. 5 is a fragmentary cross-sectional view of one of the fixed panels and one of the floating panels of FIG. 1.
FIG. 6 is a perspective view of one of the fixed panels of FIG. 1.

FIGS. 1-3 illustrate a heat-resistant apparatus 10 mounted to or integral with an inner surface 12 of an inner fixed structure (IFS) 14 of an aircraft thrust reverser 16, forming a heat barrier between the IFS 14 and an aircraft engine 18. In some embodiments of the invention, the thrust reverser 16 may have more than one IFS 14, as illustrated in FIG. 3. An outer surface 20 of each IFS 14 may be exposed to air from an aircraft engine fan 22 within an air duct 24, while the inner surface 12 of the IFS 14 may face the aircraft engine 18. The heat-resistant apparatus 10 may comprise a plurality of rigid, fireproof panels 26,28 and a plurality of fasteners 30 (illustrated in FIG. 5) to attach the panels 26,28 to each other and to the IFS 14. As illustrated in FIGS. 4-6, the panels 26,28 may each comprise an outer surface 32 facing the IFS 14, an inner surface 34 facing the engine 18, a forward edge 36, an aft edge 38, a left edge 40, and a right edge 42. The panels 26,28 may have any size and dimensions required for a particular application. For example, the panels 26,28 may be shaped such that when the panels 26,28 are attached to each other, the shape of the apparatus 10 substantially matches the shape of the inner surface of the IFS 14. In one embodiment of the invention, the panels 26,28 may be substantially quadrilateral, with an average dimension of the panels 26,28 being approximately 18 inches by 24 inches. However, other shapes and sizes of the panels 26,28 may be used.

As illustrated in FIG. 4, each of the panels 26,28 may comprise a rigid core 44 surrounded by various fireproof or heat resistant materials. For example, the core 44 may be a honeycomb core and may be made of any core material, including polymide resin within fiberglass reinforcement, such as HRH-327 fiberglass reinforced polyimide or an equivalent high temperature resistant core. Layers 46,48 of various heat resistant and/or non-heat resistant materials may be bonded or otherwise attached to the core 44. The layers 46,48 may comprise materials such as carbon reinforced laminate, polyimide, bismaleimide (BMI) resin, various epoxies, hi-temp reinforced laminate, pthalo-nitrile, other oligymers, hi-temp polyimide adhesive, siloxane matrix leached silica woven glass fabric, etc. The materials may be placed in a variety of order combinations. Additionally, an outer layer 46 of a particular combination of materials may be used to form the outer surface 32 of each panel 26,28 while an inner layer 48 of a particular combination of materials may be used to form the inner surface 34 of each panel 26,28.

The outer layer 46 may be bonded to an outward-facing surface 50 of the core 44 using any method known in the art. In one embodiment of the invention, illustrated in FIG. 4, the outer layer 46 may comprise one or more layers of composite material 51 bonded to the outward-facing surface 50 using an adhesive 53. For example, the composite material 51 may be a combination of one or more of a medium performance carbon reinforced laminate, polyimide, BMI, and some epoxy, which may be bonded to the core 44 using polyimide adhesive at least 0.050 PSF. In other embodiments, the outer layer 46 may comprise composite laminate using graphite fiber reinforced fabric impregnated with a polyimide resin and capable of high temperature resistance.

The inner layer 48 may be bonded to an inward-facing surface 52 of the core 44 using any method known in the art. The inner layer 48 may comprise hi-temp composite or polyimide facings having a higher temperature resistance capacity than the materials comprising the outer layer 46. In the embodiment illustrated in FIG. 4, a layer of composite material 55 may be bonded to the inward-facing surface 52 with the adhesive 53, then a fireproof material 57 may be bonded to the composite material 55. An additional temperature resistant layer of thermal protection 52A can be inserted into the inward-facing surface 52, of the core 44, for a greater thermal resistance and multiple layers of redundant fire protection.

The additional layer 52A can be a filled phenolic layer, refractory material, or other fire resistant materials including silica, for example. The additional layer 52A should be a minimum of 0.100 inch thick. For example, hi-temp composite or polyimide facings may be bonded with polyimide adhesive to a fireproof, temperature resistant pre-preg of leached, silica fiberglass, and/or siloxane impregnated resin. Specifically, a siloxane matrix leached silica woven glass fabric of 0.050 inches may be attached to a hi-temp carbon reinforced laminate and/or other materials mentioned herein using a hi-temp polyimide adhesive of at least 0.100 PSF. In some embodiments of the invention, the siloxane matrix leached silica woven glass fabric may be exposed to engine heat of approximately 650 to 800 degrees F.

The plurality of panels 26,28 may include a plurality of fixed panels 26 and a plurality of floating panels 28 arranged in alternating succession with each other in a substantially checkered configuration. The fixed panels 26 may be attached directly to the IFS 14, while the floating panels 28 may be attached directly to the fixed panels 26.

Figure 11:
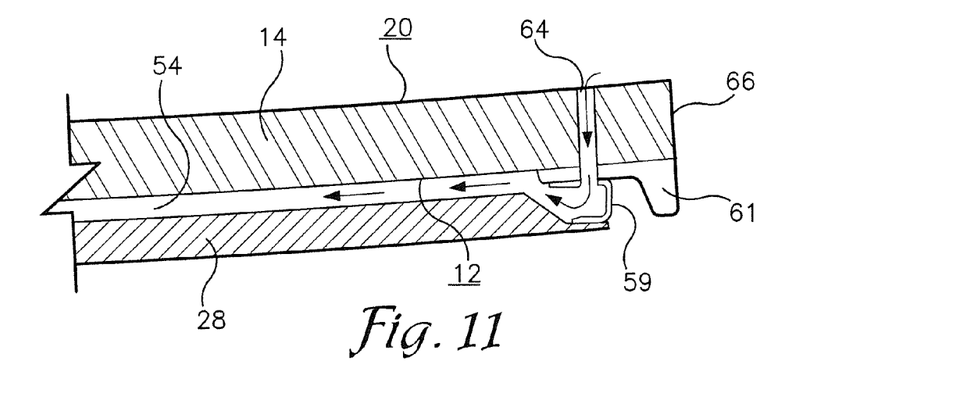
FIG. 11 is a fragmentary cross-sectional view of one of the floating panels attached with a bracket to the IFS.

The fixed and floating panels 26,28 may be configured and affixed to the IFS 14 such that air may flow through a space 54 between the panels 26,28 and the IFS 14, as illustrated in FIGS. 5 and 11-14. For example, the panels 26,28 may each comprise a substantially flat portion 56 surrounded by a substantially angled or beveled portion 58 proximate the edges 36-42 of the panels 26,28, as illustrated in FIGS. 5-6. Furthermore, flange portions 60 may extend from the angled or beveled portions 58 of the panels 26,28 and may be configured for attachment to the IFS 14 or one of the fixed panels 26, such that the flat portion 56 of the floating panels 28 does not touch any portion of surfaces that the flange portions 60 of the fixed panels 26 are attached to. FIG. 11 illustrates a bracket 59 for attaching one of the floating panels 28, located at a forward end 66 of the IFS 14, to the IFS 14. For example, the bracket 59 may attach the panel 28 to a vee-blade 61 of the thrust reverser 16.

Figure 12:
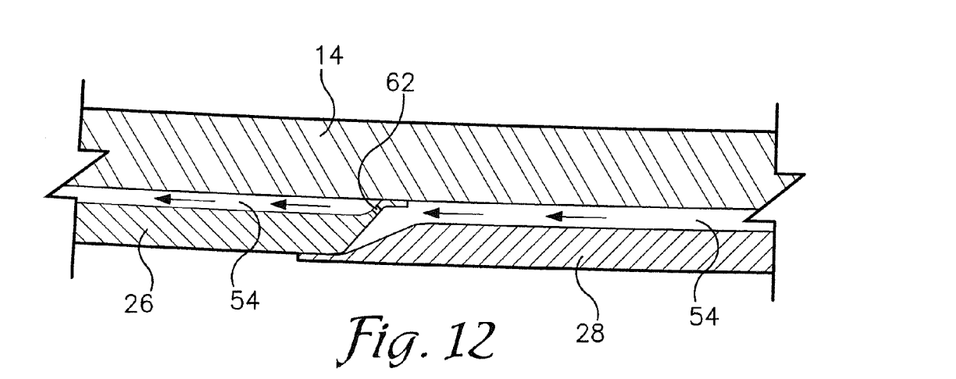
FIG. 12 is a fragmentary cross-sectional view of one of the floating panels attached to one of the fixed panels, with the fixed panel attached to the IFS and air flowing therebetween.
Figure 13:
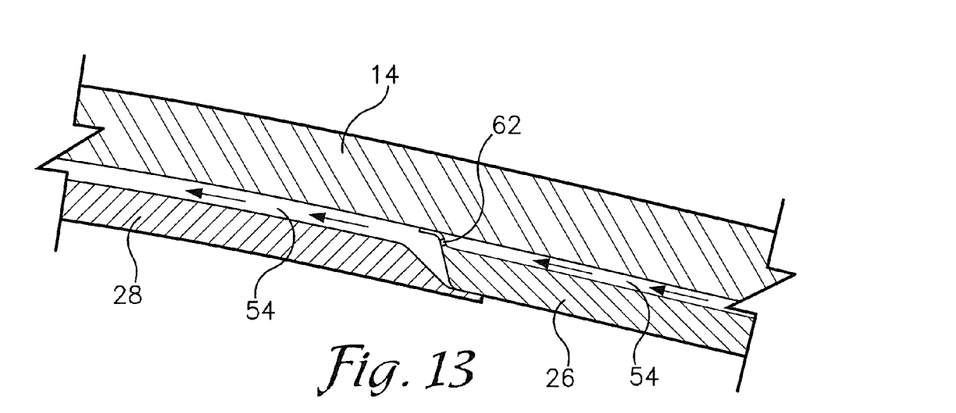
FIG. 13 is a fragmentary cross-sectional view of one of the fixed panels attached to the IFS and one of the floating panels attached to the fixed panel.

As illustrated in FIG. 6, the fixed panels 26 may have a plurality of holes 62 formed proximate their forward and aft edges 36,38 to allow air to pass between the IFS 14 and the floating and fixed panels 26,28. The floating panels 28 may be attached to the inner surfaces 34 of the fixed panels 26 such that the holes 62 of the fixed panels 26 are positioned between one of the floating panels 28 and the IFS 14, as illustrated in FIGS. 12 and 13. For example, the holes 62 may be formed within the angled or beveled portion 58 of the fixed panels 26 proximate the forward edges 36 and the aft edges 38 such that air may flow in a forward-to-aft direction between the heat-resistant apparatus 10 and the IFS 14. Arrows illustrated within the space 54 in FIGS. 11-14 depict a direction of airflow.

Figure 10:
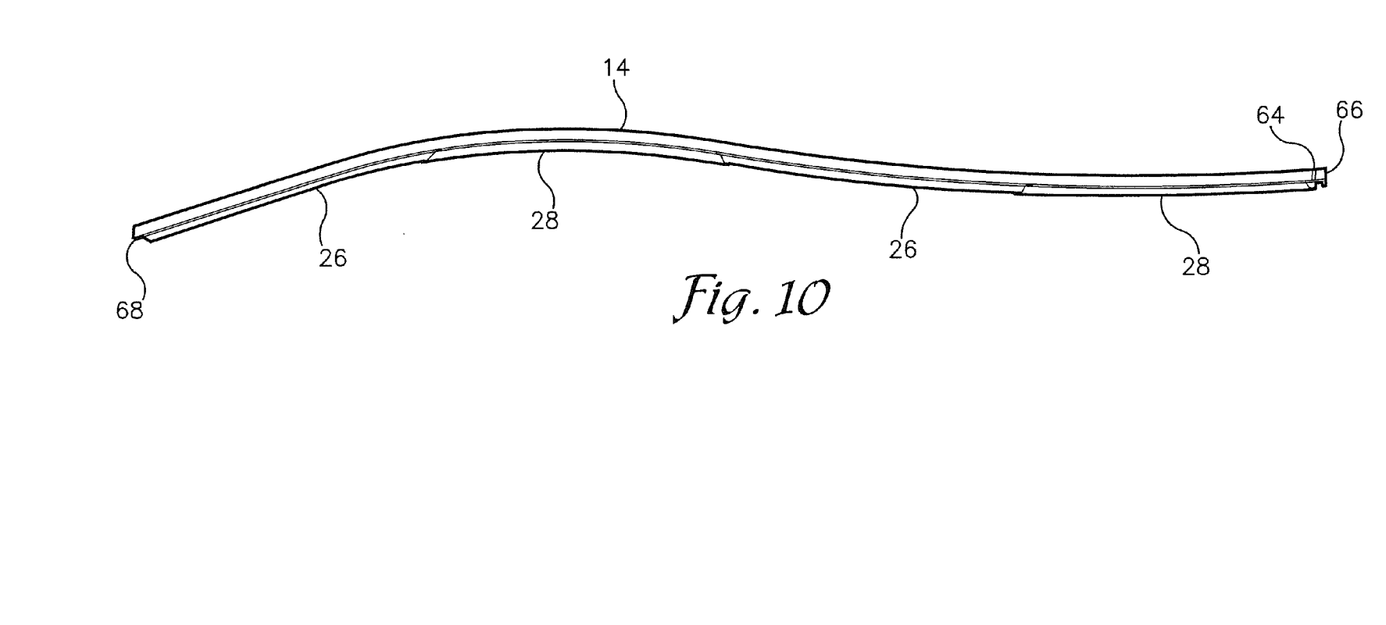
FIG. 10 is a cross-sectional view of the heat-resistant apparatus mounted on the IFS of FIG. 1.
Figure 14:
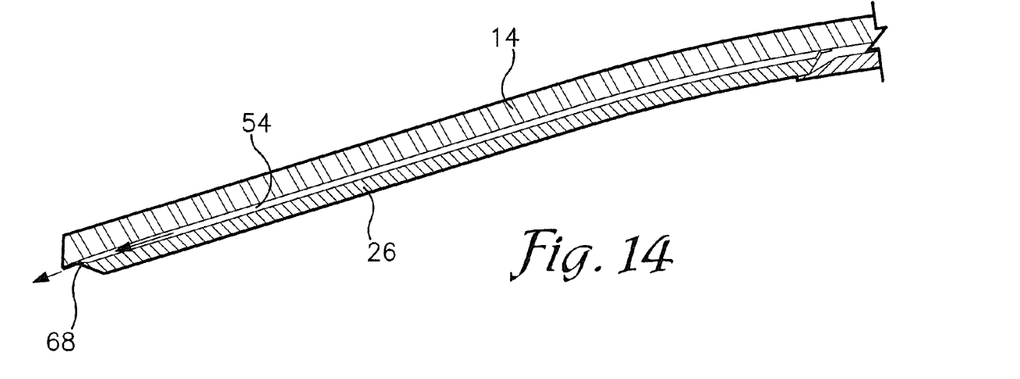
FIG. 14 is a fragmentary cross-sectional view of one of the fixed panels attached to the IFS with air flowing aftward through one or more holes formed in the fixed panel.

As illustrated in FIGS. 10 and 11, one or more additional holes 64 may be formed within the IFS 14 proximate a forward end 66 of the IFS 14 to allow cooler air from the air duct 24 into the space 54 between the IFS 14 and the panels 26,28. Additionally, the air flowing between the IFS 14 and the panels 26,28 may exit at an aft opening 68 and/or the holes 62 formed in aft-most ones of the fixed panels 26, as illustrated in FIGS. 10 and 14.

Figure 9:
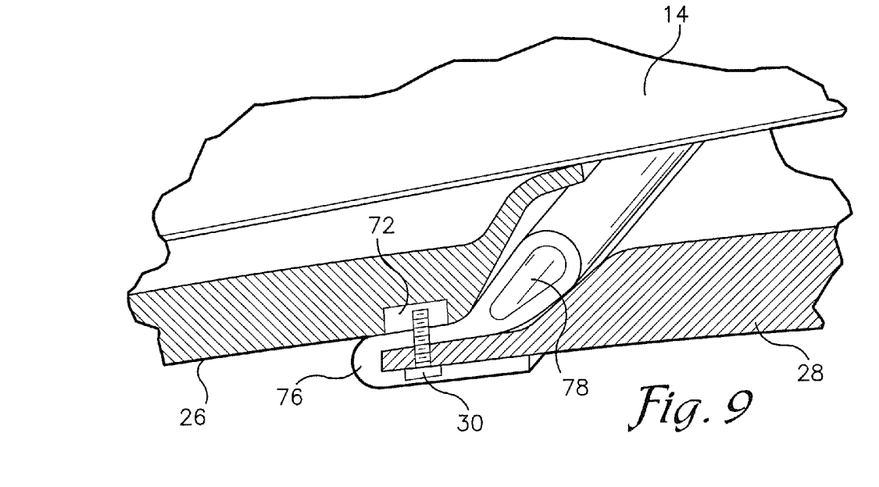
FIG. 9 is a fragmentary cross-sectional view of one of the floating panels and one of the fixed panels of FIG. 1 including a fastener connecting with the bushing of FIG. 7 and covered by the wrapping seal of FIG. 8.

The fasteners 30, illustrated in FIGS. 5 and 9, may be any type of fastening apparatuses for mechanically or otherwise fixing the fixed panels 26 to the IFS 14 and the floating panels 28 to the fixed panels 26. For example, the fasteners 30 may include one or more of bolts, rivets, brackets, clips, screws, bushings, etc. As illustrated in FIG. 5, the floating panels 28 may be fixed to the fixed panels 26 in such a way as to cover the fasteners 30 connecting the fixed panels 26 to the IFS 14.

This configuration may shield at least some of the fasteners 30 which are in direct contact with the IFS 14 from heat radiated by the engine 18. Furthermore, as illustrated in FIG. 5, a fire seal 70 may be inserted between the angled or beveled portions 58 and/or the flange portions 60 of adjacent ones of the panels 26,28 to prevent heat from seeping in through spaces or gaps between the plurality of panels 26,28. The fire seal 70 may be any type of sealant or heat-resisting material.

Figure 7:
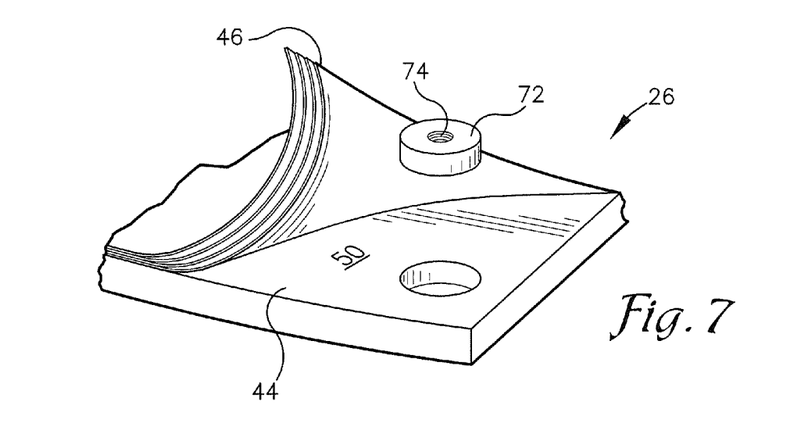
FIG. 7 is a fragmentary perspective view of a core of one of the panels of FIG. 1 configured to receive a bushing, as illustrated.

In one embodiment of the invention, illustrated in FIGS. 7 and 9, a bushing 72, such as a polyimide bushing, may be inserted into the core 44 of any of the panels 26,28 prior to applying the outer layer 46 and/or the inner layer 48, such that when the outer and/or inner layers 46,48 are bonded to the core 44, the bushing 72 is sealed inside of the panel 26,28 and thermally protected. Furthermore, the bushing 72 may be substantially oval to resist torque. A threaded insert 74 may also be inserted into the bushing before or after bonding the bushing 72 to the core 44 and the outer and inner layers 46,48, such that one of the fasteners 30, such as a screw, may be received therein. This feature primarily ensures that any heat from the engine is not transmitted via fasteners to the IFS 14.

Figure 8:
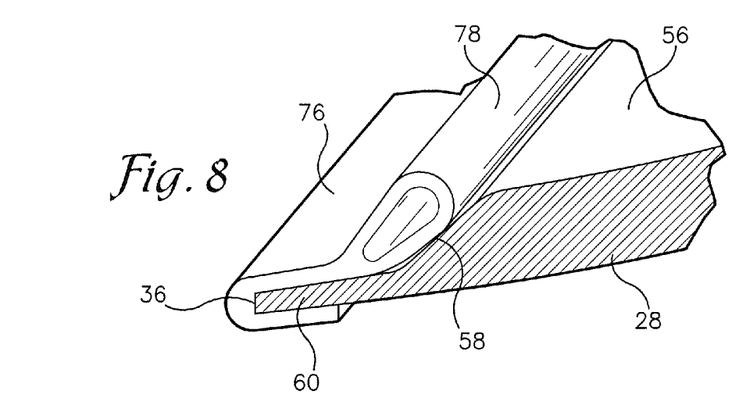
FIG. 8 is a fragmentary cross-sectional view of one of the panels of FIG. 1 with a wrapping seal wrapped around an edge of the panel.

In various embodiments of the invention, as illustrated in FIGS. 8-9, a wrapping seal 76 (also referred to herein as a fastener cover) may be wrapped around edges 36-42 of any of the floating panels 28 in such a configuration as to shield the fasteners 30 of the floating panels 28 from the engine's heat. Furthermore, the wrapping seal 76 may also comprise a sealing portion 78 between the angled or beveled portions 58 of the panels 26,28 to serve as a fire seal, thereby replacing the fire seal 70 illustrated in FIG. 5. The wrapping seal 76 may be bonded to the panels 26,28 using any method described herein or known in the art, and may be made of any fire or heat resistant material.

Figure 15:
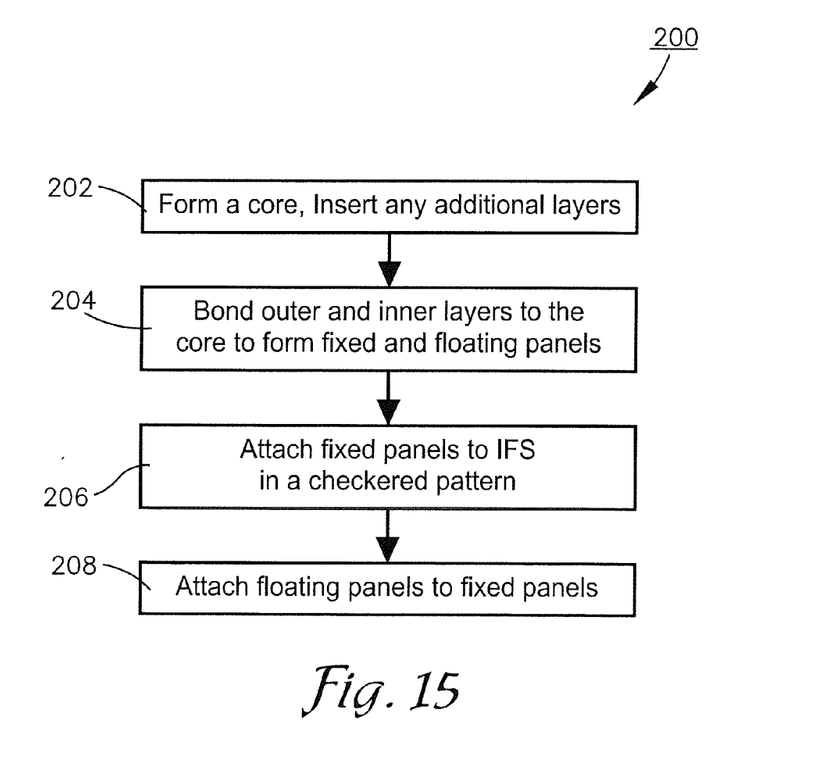
FIG. 15 is a flow chart of a method of forming and installing the heat-resistant apparatus of FIG. 1 in accordance with an embodiment of the present invention.

A method 200 of forming the apparatus 10 is illustrated in FIG. 15. Step 202 depicts forming a core 44 and inserting any additional layers 52A, followed by bonding the outer and inner layers 46,48 to the core 44, as in step 204, to form the panels 26,28. As described above, forming the core 44 may include inserting bushings 72 therein. In one example, the fixed panels 26 may be fastened to the IFS 14 in a checkerboard pattern, as depicted in step 206. Then each of the floating panels 28 may be attached to the inner surface 34 of one or more of the fixed panels 26 in an alternating, checkered pattern. For example, one of the fixed panels 26 may have four separate ones of the floating panels 28 attached thereto, with each of the floating panels 28 attached at or proximate one of the four edges 36-42 of the fixed panel 26.

Attaching the panels 26,28 to each other may comprise attaching or applying one or more of the fire seals 70 and/or one or more of the wrapping seals 76 to the panels 26,28 in any combination of the configurations described above. Attaching the panels 26,28 to each other may also comprise using the fasteners 30 as described above. Step 208 depicts attaching each of the floating panels 28 to the fixed panels 26. However, note that steps 206 and 208 may be performed in any order, such as attaching the floating panels 28 and the fixed panels 26 to each other and to the IFS 14 in alternating succession.

In various embodiments of the invention, the panels 26,28 may be configured to withstand temperatures of up to 800 degrees F., while keeping the space 54 between the panels 26,28 and the IFS 14 below 280 degrees F. The rigidness of the panels 26,28 provided by the core 44 may also provide additional structural stiffness and damage tolerance to the IFS 14. Additionally, the embodiments described herein, such as illustrated in FIG. 4, may resist thermal aging and pass AC20-135 fire test criteria for propulsion (i.e. 2000 degrees F. for 15 minutes).

Because the space 54 between the panels 26,28 and the IFS 14 is small, the air pressure therein is higher than air pressure in a space between the panels 26,28 and the engine 18 and is higher than the pressure within the air duct 24. Therefore, if one of the panels 26,28 is punctured, the cool air from between the panels 26,28 and the IFS 14 may be urged to flow into the space between the panels 26,28 and the engine 18, thereby keeping the heat from the engine 18 from flowing into the puncture hole toward the IFS 14. Therefore, another advantage of the apparatus 10 is the ability to protect the IFS 14 from heat, even if one or more of the panels 26,28 is slightly damaged.

Although the invention has been described with reference to the embodiments illustrated in the attached drawings, it is noted that equivalents may be employed and substitutions made herein without departing from the scope of the invention as recited in the claims. For example, the heat-resistant apparatus 10 may be integral with and/or may comprise the IFS 14.

Having thus described an embodiment of the invention, what is claimed as new and desired to be protected by Letters Patent includes the following:

1. A heat-resistant apparatus for an aircraft engine nacelle, the apparatus comprising:
a plurality of fixed panels that are rigid and configured to be attached to an inner surface of an internal fixed structure (IFS) of a thrust reverser such that at least a portion of the fixed panels are spaced a distance away from the inner surface of the IFS such that air flows between the fixed panels and the IFS, each of the fixed panels having an inner surface and an outer surface, wherein at least one of the inner surface and the outer surface of each of the fixed panels is substantially fireproof; and
a plurality of floating panels that are rigid and configured to be attached to the inner surface of at least one of the fixed panels, each of the floating panels having an inner surface and an outer surface, wherein at least one of the inner surface and the outer surface of each of the floating panels is substantially fireproof,
wherein each of the floating panels is attached to at least one of the fixed panels,
wherein the fixed panels and the floating panels each comprise a honeycomb core and layers of at least one of heat-resistant material and composite material.

2. The heat-resistant apparatus of claim 1, wherein a plurality of holes are formed into at least a portion of the fixed panels proximate a forward edge and an aft edge, such that air may flow in a substantially forward-to-aft direction between the IFS and the fixed panels.

3. The heat-resistant apparatus of claim 1, further comprising the IFS, wherein the fixed panels are attached to the IFS and the floating panels are attached to the fixed panels.

4. The heat-resistant apparatus of claim 3, wherein the IFS has at least one hole extending from an outer surface of the IFS to the inner surface of the IFS, such that air on an outer side of the IFS flows into a space between the floating panels or the fixed panels and the IFS.

5. The heat-resistant apparatus of claim 1, further comprising fasteners configured for attaching the fixed panels to the IFS, wherein the floating panels are fixed to the inner surface of the fixed panels and are positioned such that the floating panels cover the fasteners.

6. The heat-resistant apparatus of claim 1, further comprising
fasteners, at least some of which attach the fixed panels and the floating panels with each other and at least some of which are configured for attaching the fixed panels with the IFS; and
one or more fastener covers that are substantially heat resistant, wrap around an edge of at least one of the floating panels, and substantially cover at least one of the fasteners.

7. The heat-resistant apparatus of claim 1, further comprising a fire seal positioned at or proximate to edges of the fixed panels and the floating panels to substantially seal any gaps between the fixed panels and the floating panels.

8. The heat-resistant apparatus of claim 1, further comprising oval-shaped bushings embedded within one or more of the fixed panels or the floating panels and configured for receiving fasteners for attaching the fixed panels or the floating panels with at least one of each other and the IFS.

9. A heat-resistant apparatus comprising
a plurality of fixed panels that are rigid and each have an inner surface, an outer surface, a forward edge, and an aft edge, each of the fixed panels having a plurality of holes formed proximate the forward edge and the aft edge, wherein at least one of the inner surface and the outer surface of each of the fixed panels is substantially fireproof; and
a plurality of floating panels that are rigid and each have an inner surface and an outer surface, wherein at least one of the inner surface and the outer surface of each of the floating panels is substantially fireproof,
wherein the fixed panels are configured to be attached to an inner surface of an internal fixed structure (IFS) of a thrust reverser such that at least a portion of the fixed panels and the floating panels are spaced a distance away from the inner surface of the IFS, such that air flows between the panels and the IFS,
wherein the floating panels are attached to the fixed panels in an alternating, checkered configuration proximate edges of the fixed and floating panels, such that at least a portion of the floating panels overlap at least a portion of the holes of the fixed panels, and such that the floating panels do not make physical contact with the IFS when the fixed panels are attached to the IFS,
wherein the fixed panels and the floating panels each comprise a honeycomb core and layers of at least one of heat-resistant material and composite material.

10. The heat-resistant apparatus of claim 9, further comprising the IFS, wherein the fixed panels are attached to the IFS and the floating panels are attached to the fixed panels.

11. The heat-resistant apparatus of claim 10, wherein the IFS further comprises at least one hole extending from an outer surface of the IFS to the inner surface of the IFS, such that air outward of the IFS flows into a space between the fixed panels and the floating panels and the IFS in a substantially forward-to-aft direction.

12. The heat-resistant apparatus of claim 9, further comprising fasteners for attaching the fixed panels to the IFS, wherein the floating panels are fixed to the inner surface of the fixed panels and are positioned such that the floating panels cover the fasteners.

13. The heat-resistant apparatus of claim 9, further comprising
one or more fasteners for attaching the fixed panels and the floating panels with each other and with the IFS; and
one or more fastener covers configured to be substantially heat resistant and to wrap around an edge of at least one of the fixed panels and the floating panels and substantially cover at least one of the fasteners.

14. The heat-resistant apparatus of claim 9, further comprising a fire seal positioned at or proximate to edges of the fixed panels and the floating panels to substantially seal any gaps between the fixed panels and the floating panels.

15. The heat-resistant apparatus of claim 9, further comprising oval-shaped bushings embedded within one or more of the fixed panels and the floating panels and configured for receiving fasteners for attaching the fixed panels and the floating panels with at least one of each other and the IFS.

16. A method of forming and installing a heat-shielding apparatus into an aircraft thrust reverser, the method comprising:
forming a plurality of rigid honeycomb cores;
bonding a plurality of layers of materials, including at least one heat-resistant material, onto the plurality of honeycomb cores to form a plurality of fixed panels and a plurality of floating panels;
attaching the plurality of floating panels to a heat-resistant surface of the plurality of fixed panels; and
attaching the plurality of fixed panels to an internal fixed structure of the thrust reverser between an engine and the internal fixed structure in a configuration such that air flows from a fan duct outward of the internal fixed structure into a space between the fixed panels and the floating panels and the internal fixed structure.

17. The method of claim 16, further comprising forming a plurality of holes in the fixed panels proximate a forward and an aft edge of each of the fixed panels such that the holes are positioned between the floating panels and the internal fixed structure.

18. The method of claim 17, further comprising forming at least one hole extending from an outer surface of the internal fixed structure to an inner surface of the internal fixed structure, such that air on an outer side of the internal fixed structure flows into the space between the fixed panels and the floating panels and the IFS in a substantially forward-to-aft direction.

* * * * *